US009594801B2

(12) United States Patent
Wong

(10) Patent No.: US 9,594,801 B2
(45) Date of Patent: Mar. 14, 2017

(54) SYSTEMS AND METHODS FOR ALLOCATING WORK FOR VARIOUS TYPES OF SERVICES AMONG NODES IN A DISTRIBUTED COMPUTING SYSTEM

(71) Applicant: Akamai Technologies, Inc., Cambridge, MA (US)

(72) Inventor: Kai C. Wong, Saratoga, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 269 days.

(21) Appl. No.: 14/451,172

(22) Filed: Aug. 4, 2014

(65) Prior Publication Data
US 2015/0281114 A1 Oct. 1, 2015

Related U.S. Application Data

(60) Provisional application No. 61/972,199, filed on Mar. 28, 2014.

(51) Int. Cl.
*G06F 17/30* (2006.01)
*H04L 29/08* (2006.01)

(52) U.S. Cl.
CPC ........ *G06F 17/30386* (2013.01); *H04L 67/10* (2013.01); *H04L 67/34* (2013.01)

(58) Field of Classification Search
CPC ........ G06F 17/30864; G06F 17/30867; G06Q 30/02
USPC ........ 707/748, 798, 703, 634, 690; 709/223, 709/229
See application file for complete search history.

(56) References Cited

U.S. PATENT DOCUMENTS

| 6,859,823 B1* | 2/2005 | Nishihara | G06Q 10/10 700/100 |
| 7,472,178 B2 | 12/2008 | Lisiecki et al. | |
| 2004/0098490 A1* | 5/2004 | Dinker | H04L 29/12009 709/229 |
| 2007/0214183 A1* | 9/2007 | Howe | G06F 17/30067 |
| 2012/0117214 A1* | 5/2012 | Mengle | G06F 9/5055 709/223 |

FOREIGN PATENT DOCUMENTS

WO 2008013632 1/2008

OTHER PUBLICATIONS

Lo, J. et al., Active Nodal Task Seeking for High-Performance, Ultra-Dependable Computing, DoD Technical Information Semi-annual Report Jan. 15-Jul. 15, 1994, report date Jul. 1994, 29 pages, available through DTIC Online http://www.dtic.mil/get-tr-doc/pdf?AD=ADA282924; also published in IEEE Transactions on Aerospace & Electronic Systems, vol. 31, Issue No. 4, Oct. 1995, 29 pages.

Lo, J. et al., Ultra-Dependable, High-Performance, Real-Time Signal Processing, DoD Technical Information, Report Aug. 20, 1996, 63 pages, available through DTIC Online http://www.dtic.mil/docs/citations/ADA313491.

(Continued)

*Primary Examiner* — Mariela Reyes
*Assistant Examiner* — Thong Vu

(57) ABSTRACT

In a distributed computing system, the allocation of workers to tasks can be challenging. In embodiments described herein, nodes in such a system can execute takeover algorithms that provide efficient, automated, and stable allocation of workers to tasks.

15 Claims, 1 Drawing Sheet

(56) References Cited

OTHER PUBLICATIONS

U.S. Appl. No. 14/543,507, filed Nov. 17, 2014.
Wayback Archive of BigCouch API web page, http://bigcouch.cloudant.api.available at https://web.archive.org/web/20131019205815/http://bigcouch.cloudant.api, dated Oct. 19, 2013 (archive downloaded Nov. 30, 2015), 2 pages.
Wayback Archive of web page Couchbase vs. Apache CouchDB, http://www.couchbase.com/couchbase-vs-couchdb, available at https://web.archive.org/web/20131228052903/http://www.couchbase.com/couchbase-vs-couchdb, dated Dec. 28, 2013 (archive Nov. 30, 2015), 3 pages.
Web page HTTP_view_API Couchdb, Wikihttp://wiki.apache.org/couchdb/HTTP_view_API, last edited Jun. 5, 2013, (downloaded Nov. 30, 2015), 10 pages.
Web page, Introduction_to_CouchDB_views Couchdb Wiki, https://wiki.apache.org/couchdb/Introduction_to_CouchDB_views, last edited Jun. 5, 2013 (downloaded Nov. 30, 2015), 9 pages.
NoSQL, Wikipedia web page entry, dated Mar. 27, 2014, at https://en.wikipedia.org/w/index.php?title=NoSQL&oldid=601511474, (downloaded Nov. 30, 2015), 15 pages.
Web page, Scaling Out CouchDB with BigCouch, at http://nosql.mypopescu.com/post/1529034946/scalingoutcouchdbwithbigcouch, dated Nov. 9, 2010, 2 pages.
Transcript of video on web page Scaling Out CouchDB with BigCouch, video available at http://nosql.mypopescu.com/post/1529034946/scalingoutcouchdbwithbigcouch, page dated Nov. 9, 2010, video dated Oct. 2010, 49 pages.
A. Kocoloski, Scaling CouchDB with BigCouch, O'Reilly Webcast, slides, Oct. 2010, 23 pages, available at http://www.slideshare.net/Cloudant/scaling-couchdb-with-bigcouch-5555464.
Wayback archive of web page Why NoSQL?, http://www.couchbase.com/whynosql/nosqldatabase, available at https://web.archive.org/web/20131106150835/http://www.couchbase.com/why-nosql/nosql-database, dated Dec. 28, 2013 (downoaded Nov. 30, 2015), 7 pages.
Wayback Archive of web page Couchbase vs. Apache CouchDB, http://www.couchbase.com/couchbase-vs-couchdb, available at https://web.archive.org/web/20131228052903/http://www.couchbase.com/couchbase-vs-couchdb, dated Dec. 28, 2013 (downloaded Dec. 18, 2015) 3 pages.

* cited by examiner

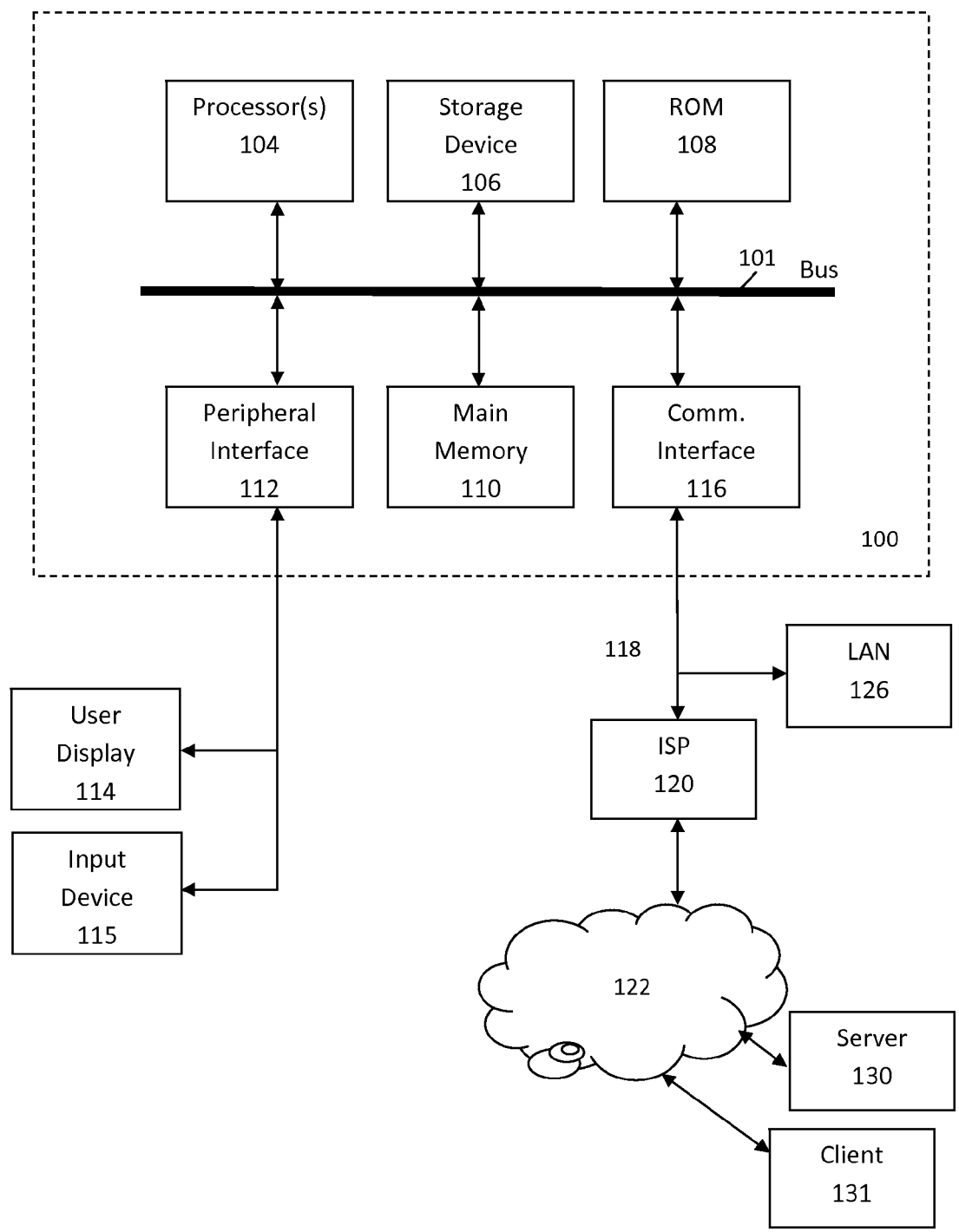

SYSTEMS AND METHODS FOR ALLOCATING WORK FOR VARIOUS TYPES OF SERVICES AMONG NODES IN A DISTRIBUTED COMPUTING SYSTEM

CROSS REFERENCE TO RELATED APPLICATIONS

This application is based on and claims the benefit of priority of U.S. Application No. 61/972,199, filed Mar. 28, 2014, the teachings of which are hereby incorporated by reference in their entirety.

Material contained in this document is subject to copyright protection. The copyright owner has no objection to the facsimile reproduction by anyone of the patent document or the patent disclosure, as it appears in Patent and Trademark Office patent files or records, but otherwise reserves all copyright rights whatsoever.

BACKGROUND

Technical Field

This application relates generally to distributed data processing systems and to distributed storage systems and services.

Brief Description of the Related Art

Distributed computing systems are known in the art. One such distributed system is a "content delivery network" or "CDN" that is operated and managed by a service provider. The service provider typically provides the content delivery service on behalf of third parties. A "distributed system" of this type typically refers to a collection of autonomous computers linked by a network or networks, together with the software, systems, protocols and techniques designed to facilitate various services, such as content delivery or the support of outsourced site infrastructure.

Other examples of distributed computer systems include distributed storage systems and services, including distributed databases. A distributed storage system can be used to provide a cloud storage solution. A content delivery network may utilize distributed storage to provide a network storage subsystem, which may be located in a network datacenter accessible to CDN proxy cache servers and which may act as a source/origin of content, such as described in U.S. Pat. No. 7,472,178, the disclosure of which is incorporated herein by reference. In this regard, a network storage system may be indexed by distributed databases that map input keys to data that points to storage locations in the manner of a file lookup service. In this way, the storage system may be used for storage of Internet content, such as images, HTML, streaming media files, software, and other digital objects, and as part of a CDN infrastructure.

Distributed storage systems (including database systems and services) typically rely on a variety of system services to keep the system operating well. Such services might include, without limitation, monitoring for nodes that are down, migrating or replicating data, resolving conflicts amongst replicas, compacting data, age-based deletion of data, and the like. Some services are common to many kinds of storage systems, others are particular to the nature and architecture of the system. For example, consider the variety of existing distributed databases: a SQL database may need different services than a no-SQL database, and a document-based no-SQL database may need different services than a column-based no-SQL database.

A distributed storage system typically has many nodes, and so it typically has many workers potentially available to perform the necessary work. However, it is challenging to distribute tasks to the workers (and by extension to the nodes that the workers are running on) in an efficient way, given dynamically changing loads, various service types and potential node faults. The teachings hereof address the need to coordinate allocation of work and tasks in distributed computing systems, the need to dynamically adjust this allocation, and the need to minimize the overhead used in doing so. The teachings hereof relate to technical improvements in operation and management of distributed computing platforms, and in analogous technologies, and can be used to improve the operation and efficiency of a distributed computing platform, including distributed storage platforms. Many benefits and advantages will become apparent from the teachings hereof.

BRIEF DESCRIPTION OF THE DRAWINGS

The teachings hereof will be more fully understood from the following detailed description taken in conjunction with the accompanying drawings, in which:

FIG. 1 is a block diagram illustrating hardware in a computer system that may be used to implement the teachings hereof.

DETAILED DESCRIPTION

The following description sets forth embodiments of the invention to provide an overall understanding of the principles of the structure, function, manufacture, and use of the methods and apparatus disclosed herein. The systems, methods and apparatus described herein and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, publications and references cited herein are expressly incorporated herein by reference in their entirety. Throughout this disclosure, the term "e.g." is used as an abbreviation for the non-limiting phrase "for example."

In the following description, the term 'node' is used to refer to a physical computing machine, virtual machine, or equivalent. The term 'worker' is used to refer to a process, thread, managed sequence of instruction execution, or equivalent, that executes on a node to perform work. Depending on the machine, processor and operating system configuration, a node may host one worker or multiple.

The teachings hereof apply generally to distributed storage systems, including distributed database systems. Some of the examples of tasks/work to be performed herein are applicable to distributed storage systems generally, while others are particular in nature to distributed databases; the teachings hereof can be applied to allocate and manage work in both without limitation.

Distributed storage systems (including database systems and services) typically rely on a variety of services to keep the system and/or database operating well. Services may be broken down into one or more tasks, and in that way represent a logical grouping of tasks. For example, a cleanup service that deletes old data from a database (e.g., age-based deletion) may be broken down into a plurality of deletion tasks. One task may be to delete old data in a given directory or with a given attribute (such as one owner's data). Another deletion task, meanwhile, may involve deleting old data in another directory or with another attribute (e.g., another owner's data). By breaking the service down into tasks, the tasks can be run in parallel. A service may also be composed of one task. A service may also be composed of tasks that run periodically, e.g., that are repeated every so often.

Typical services include, without limitation, monitoring for nodes that are down, migrating or replicating data, resolving conflicts amongst replicas, compacting data, periodically deleting old data (data cleanup), propagating changes across replicas or partitions, among others. In a database such as 'couchdb,' a typical task is to calculate or refresh a view. Some kinds of services are common to many systems. Others are more specific to nature and architecture of a particular system.

One way of distributing tasks to workers is to have workers autonomously pick up tasks when they are idle, e.g., from a task table that defines the tasks available and what the task requires (such as which root directory to scan for age-based deletion, or the like). The task table can be maintained in a given designated node, to which workers on other nodes reach out; alternatively, replicas of the task table could be maintained in multiple nodes, assuming appropriate synchronization and coherence services.

In such a system, when a worker becomes idle, it finds the next available task in the task table and signs up for it (e.g., by inserting its worker identifier into the task table), potentially along with a start_time and completion_time. Multiple workers can be working on multiple tasks simultaneously. Further, if a worker find no tasks (either because all task are taken or the worker limit has been exceeded), it can become a monitor. Both monitors and workers can occasionally check the task table for available tasks (e.g., to see if new tasks have been inserted or the worker limit was raised or some workers have dropped out). Further, additional columns in the task table preferably allow idle monitors to identify failed workers and a given task's most recent checkpoint, so that a stalled task can be resumed by another worker from where it was left off in case of worker failure. For example, a freshly updated heartbeat timestamp indicates that the worker is alive; further, the task completion_time can be monitored to see if the task has failed to finish.

With such a system, there are multiple workers of each type working concurrently to provide parallelism and fault-tolerance. However, there is a risk that all of the workers run on the same set of nodes in the cluster while others sit idle. As a more concrete example, consider a cluster with 50 nodes and 10 services where each service uses 5 nodes for parallelism and fault-tolerance. Without proper coordination among different services and in the worst case, we could have all 10 services running on nodes 1, 2, 3, 4, and 5, while the remaining 45 nodes sit idle doing nothing.

On the other hand, if the cluster has only 5 nodes, there is no choice but to have all services run on the same 5 nodes. So, a simplistic algorithm to keep services mutually exclusive of each other will not necessarily work.

To better coordinate workers and provide a better, dynamically adaptive distribution of services and tasks on nodes, a point system can be used. This approach can work well in any size cluster, preferably where workers don't overlap (e.g., workers are not shared across nodes), and including where workers performing different services share nodes.

In one embodiment, the point system can be as follows:
If a node already has a worker of the same service type as the worker seeking work, Q points are awarded to that node (e.g., Q=1000).

If a node already has a worker of a different service type than the worker seeking work, R points are awarded to that node, where $R \ll Q$ and preferably about an order of magnitude smaller (e.g., R=100).

For services than run occasionally rather than constantly, award S points to a node that may occasionally run this type of service, where $S \ll R$ and preferably about two orders of magnitude smaller (e.g., S=1).

Preferably, the required services and tasks are listed in a single task table in a database on a given node in the system. The task table could also be replicated across nodes, with appropriate synchronization, as noted before.

An example of shared table is provided below. In this embodiment, each service/task type are identified by the 'service_type' column in the table below; these may correspond to one of the services described earlier. There are N(x) rows for a specific service type where N(x) is the number of workers to be used for service type 'x'. The 'slot' column in the task table identifies the tasks: 1, 2, 3, ... N(x) for a given service. The 'node-id' column stores the identifier of the node that takes the corresponding slot of the associated task. The 'worker-id' column stores an identifier of the particular worker on the identified node that takes the corresponding slot of the associated task. For illustration, a task table may look like this:

| service_type | slot | node-id | worker-id | ... |
|---|---|---|---|---|
| type 1 | 1 | node_1 | node_1_wkr1 | ... |
| type 1 | 2 | node_2 | node_2_wkr1 | ... |
| ... | | | | |
| type 2 | 1 | node_2 | node_2_wkr2 | ... |
| ... | | | | |

Slots essentially represent units of work. In one embodiment, the 'slot' relates to a given task. In other words, referring to the example above, service_type 1 might be an age-based deletion service, and there might be a slot (task) corresponding to each directory and/or each customer with data on the system in which age-based deletion needs to occur.

In another embodiment, the 'slot' relates to a time slice (time period) for performing a service—in other words, a single-task service that is performed periodically. For example, if the service-type were for refreshing a view in couchdb, the slots could refer to each time slice during which the view needed to be refreshed. Thus a given worker on a given node would sign up to perform the refresh at slot (time slice) 1, while another worker would sign up to perform the refresh at slot (time slice) 2. In this way, the performance of the periodic service is time-divided amongst workers for fault-tolerance and coordination.

Initially, the table may be totally empty. The first node that runs a process to look for work for service type x will insert N(x) rows in the table where N(x) is a configuration parameter defining the number of workers needed for this service type x, assuming the task table does not have rows for them. If the table already has rows but the configuration parameter has changed, the first node can adjust the number of rows accordingly.

This first node preferably also fills the node-id column of all these rows with its own ID and fills the worker-id column with the id of the worker (e.g., process or thread) on the node that will be responsible for it. This assures that if this is the only node up in the cluster, all service slots will be assigned to a node to execute it (which will be the first node). If additional nodes in a cluster come up one at a time, it is possible that all slots for all service types are performed by this same first node.

Subsequent workers on nodes looking for work will find no empty slots but will take over busy workers who have too many slots. The worker on the node looking for work executes a takeover algorithm to determine which node to take from. In one embodiment, the takeover algorithm is as follows:

1. Calculate the total points for each of other nodes. For example, given a service type 1 worker process on node 3 looking for work, and considering the sample table provided above, and for Q=1000, R=100, and S=1, it would be found that node 1 has 1000 points and node 2 has 1100 points. Note that in this implementation, total points are calculated in light of the type of worker who is seeking work; hence, if a service_type 2 worker were looking for work, the point totals would be different: e.g., node 1 has a worker of a service type 1 (which would warrant award of R=100 points) and no worker that is of service_type 2 (so Q points would not be awarded); meanwhile, node 2 has a worker of service_type 1 (which would warrant award of R=100 points) and a worker of service_type 2 (which would warrant award Q=1000 points).
2. Identify the node with the most points; call this node_max. Continuing this example, this is node 2 with 1100 points.
3. Calculate the total points of the worker's own node; call this self_points. In this example, assume that node 3 has 0 points.
4. The algorithm determines whether to takeover as follows: take over work from node_max if node_max's points are more than T+self_points, where T is equal to Q in a preferred embodiment. In this example, node 2 is node_max with 1100 points, and node 2's 1100 points are more than T+self_points of 1000+0. So, the entry for 'service_type 1, slot 2' will be changed to node 3 (and associated worker on node 3) and node 3 will assume the service type 1 and slot 2 role from now on, and node 2 will become dedicated to run service type 2.

By assigning more points (Q>>R) to nodes with same service, the algorithm favors taking over a slot from a node with the most slots of the same type. By requiring a take-over target to have more than T points than self (where preferably T=Q), we prevent slot thrashing between two nodes because after taking over (and thus adding Q points to itself), the takeover node still has less work than the takeover target. (Otherwise, the target node may take this slot back!)

Subsequently, if a new service type 'y' is desired, the first node to run a process to look for work of that service type y will insert N(y) rows, and the approach described above can take place.

Using the foregoing approaches, node and worker distribution automatically adjusts itself over time among many service types (which can be dynamically added) with a top priority to run a given service type on different nodes if possible, and a second priority to run workers of different service types on different nodes also if possible.

Note that, in one embodiment, a single SQL query can be used and is sufficient to implement the above take-over algorithm (including point calculations, ranking, comparison, and task table update for the take-over); thus further minimizing communication overhead.

Those skilled in the art will understand that they can adjust the assigned points for each service type that has a different workload characteristics. Hence, Q, R, and S may vary by service type.

In an alternative embodiment, a leader is involved. For example, a leader process can assign slots (tasks or time slices) to nodes who ask the leader for work. Instead of the requesting worker or node itself calculating the takeover algorithm, the leader periodically calculates the point values. When asked for work, the leader consults the current point values and decides whether to take work from a given node and provide it to the requesting one. In another alternative embodiment, the leader does not wait until someone asks, but instead assigns the work to the node/worker that the leader believes should be working on it. If the worker is too slow (as indicated by missing a time deadline for a checkpoint or work completion), the leader reassigns the task elsewhere, based the point values in the takeover algorithm.

The following sample SQL code illustrates one implementation of the takeover algorithm:

```
// select worker with more work than self
// must be called after setting m_task_type
void op_multi_worker::set_take_over_target_query( )
{
  take_over_target = "(select worker from (select sum(case when
param='worker'"
    // 1000 points if worker of same task type
    " and task_type='"+m_task_type+"' then 1000 else (case when "
    // 100 points if worker of other task type
    "param='worker' then 10 else (case when param='monitor' and "
    // 1 point if a view_query monitor
    "task_type='view_query' then 1 else NULL end) end) end) as
score,worker"
    " from " TASKS_TABLE " where worker NOTNULL and (param='worker' or "
    // total the points for each node then get the node with the most point
    "param='monitor') group by worker order by score desc limit 1) where "
    // it's a target if its pts are more than 1000 + my total points
    "score > 1000+(select (case when score ISNULL then 0 else score end)
from"
    // I get 0 pt if I'm not a worker or monitor
    " (select sum(case when param='worker' and task_type='"+m_task_type+
    "' then 1000 else (case when param='worker' then 10 else (case when "
    "param='monitor' and task_type='view_query' then 1 else NULL end) end)
```

```
    "end) as score from " TASKS_TABLE " where worker="'+myipa+'")))";
  take_over_mon_target = "(select id from (select id,count(*) as score,worker
from "
    TASKS_TABLE " where " IS_MY_M_MON_TYPE " group by worker "
    "order by score desc limit 1) where score > 1+(select count(*) from "
    TASKS_TABLE " where " IS_MY_M_MON_TYPE " and worker="'+myipa+'")) ";
}
```

The teachings hereof may, without limitation, facilitate load-balancing via improved distribution of workers of multiple different service types among available nodes in a cluster, as well as the dynamic addition of service types. The teachings hereof apply equally well from a single-node cluster to large clusters with thousands of nodes or more. The number of needed workers per type, the number of service types, and the nodes that are available can change dynamically and the teachings hereof can still be applied.

It is noted that the foregoing are benefits that may be obtained through the practice of the teachings hereof, but are not necessary to be achieved or required for the practice of the teachings hereof.

Computer Based Implementation

The subject matter described herein may be implemented with computer systems, as modified by the teachings hereof, with the processes and functional characteristics described herein realized in special-purpose hardware, general-purpose hardware configured by software stored therein for special purposes, or a combination thereof.

Software may include one or several discrete programs. A given function may comprise part of any given module, process, execution thread, or other such programming construct. Generalizing, each function described above may be implemented as computer code, namely, as a set of computer instructions, executable in one or more microprocessors to provide a special purpose machine. The code may be executed using conventional apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

FIG. 1 is a block diagram that illustrates hardware in a computer system 100 on which embodiments of the invention may be implemented. The computer system 100 may be embodied in a client device, server, personal computer, workstation, tablet computer, wireless device, mobile device, network device, router, hub, gateway, or other device.

Computer system 100 includes a microprocessor 104 coupled to bus 101. In some systems, multiple microprocessor and/or microprocessor cores may be employed. Computer system 100 further includes a main memory 110, such as a random access memory (RAM) or other storage device, coupled to the bus 101 for storing information and instructions to be executed by microprocessor 104. A read only memory (ROM) 108 is coupled to the bus 101 for storing information and instructions for microprocessor 104. As another form of memory, a non-volatile storage device 106, such as a magnetic disk, solid state memory (e.g., flash memory), or optical disk, is provided and coupled to bus 101 for storing information and instructions. Other application-specific integrated circuits (ASICs), field programmable gate arrays (FPGAs) or circuitry may be included in the computer system 100 to perform functions described herein.

Although the computer system 100 is often managed remotely via a communication interface 116, for local administration purposes the system 100 may have a peripheral interface 112 communicatively couples computer system 100 to a user display 114 that displays the output of software executing on the computer system, and an input device 115 (e.g., a keyboard, mouse, trackpad, touchscreen) that communicates user input and instructions to the computer system 100. The peripheral interface 112 may include interface circuitry and logic for local buses such as Universal Serial Bus (USB) or other communication links.

Computer system 100 is coupled to a communication interface 116 that provides a link between the system bus 101 and an external communication link. The communication interface 116 provides a network link 118. The communication interface 116 may represent an Ethernet or other network interface card (NIC), a wireless interface, modem, an optical interface, or other kind of input/output interface.

Network link 118 provides data communication through one or more networks to other devices. Such devices include other computer systems that are part of a local area network (LAN) 126. Furthermore, the network link 118 provides a link, via an internet service provider (ISP) 120, to the Internet 122. In turn, the Internet 122 may provide a link to other computing systems such as a remote server 130 and/or a remote client 131. Network link 118 and such networks may transmit data using packet-switched, circuit-switched, or other data-transmission approaches.

In operation, the computer system 100 may implement the functionality described herein as a result of the microprocessor executing program code. Such code may be read from or stored on a non-transitory computer-readable medium, such as memory 110, ROM 108, or storage device 106. Other forms of non-transitory computer-readable media include disks, tapes, magnetic media, CD-ROMs, optical media, RAM, PROM, EPROM, and EEPROM. Any other non-transitory computer-readable medium may be employed. Executing code may also be read from network link 118 (e.g., following storage in an interface buffer, local memory, or other circuitry).

A client device may be a conventional desktop, laptop or other Internet-accessible machine running a web browser or other rendering engine, but as mentioned above a client may also be a mobile device. Any wireless client device may be utilized, e.g., a cellphone, pager, a personal digital assistant (PDA, e.g., with GPRS NIC), a mobile computer with a smartphone client, tablet or the like. Other mobile devices in which the technique may be practiced include any access protocol-enabled device (e.g., iOS™-based device, an Android™-based device, other mobile-OS based device, or the like) that is capable of sending and receiving data in a wireless manner using a wireless protocol. Typical wireless protocols include: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP. The WAP (wireless access protocol) also provides a set of network communication layers (e.g., WDP, WTLS, WTP) and corresponding functionality used with GSM and CDMA wireless networks, among others.

In a representative embodiment, a mobile device is a cellular telephone that operates over GPRS (General Packet Radio Service), which is a data technology for GSM networks. Generalizing, a mobile device as used herein is a 3G- (or next generation) compliant device that includes a subscriber identity module (SIM), which is a smart card that carries subscriber-specific information, mobile equipment (e.g., radio and associated signal processing devices), a man-machine interface (MMI), and one or more interfaces to external devices (e.g., computers, PDAs, and the like). The techniques disclosed herein are not limited for use with a mobile device that uses a particular access protocol. The mobile device typically also has support for wireless local area network (WLAN) technologies, such as Wi-Fi. WLAN is based on IEEE 802.11 standards. The teachings disclosed herein are not limited to any particular mode or application layer for mobile device communications.

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that trademarks appearing herein are the property of their respective owners and used for identification and descriptive purposes only, given the nature of the subject matter at issue, and not to imply endorsement or affiliation in any way.

The invention claimed is:

1. A method of automatically allocating work in a distributed computing system having a plurality of nodes, each of the plurality of nodes hosting at least one worker that is of at least one service type and that is for performing units of work of the at least one service type, the method being executed within and by the distributed computing system to improve the operation thereof, the method comprising:
   providing a data structure in at least one of the nodes of the plurality of nodes;
   inserting one or more records in the data structure, each of the one or more records associated with a unit of work of a first service type and each of the one or more records including an identifier of the first service type and an identifier of a first node in the plurality of nodes;
   determining that a second worker of the first service type on a second node of the plurality of nodes should take over a particular unit of work of the first service type from a first worker of the first service type on the first node, wherein the first and second workers each comprise any of a process and a thread running on the first and second nodes, respectively;
   modifying the record representing the particular unit of work by replacing the identifier of the first node with an identifier of the second node;
   wherein said step of determining that the second worker on the second node should take over the particular unit of work from the first worker on the first node comprises:
      scoring the load on the first node, based at least in part on the sum of the number of units of work being handled by the first node, where units of work of the first service type are weighted more than units of work of a second service type, the weighting of each of the first and second service types being non-zero;
      scoring the load on the second node based at least in part on the sum of the number of units of work being handled by the second node, where units of work of the first service type are weighted more than units of work of a second service type, the weighting of each of the first and second service types being non-zero;
      wherein the distributed computing system assigns a weighting to the units of work of the first service type that is more than a weighting for units of work of the second service type at least in part because the second worker, which is the candidate for the takeover, is of the first service type;
      comparing the load on the second node to the load on the first node, and determining to take over the particular unit of work based on the results of the comparison.

2. The method of claim 1, wherein the comparison involves determining whether the load on the first node exceeds the load on the second node by a predetermined amount.

3. The method of claim 1, further comprising, upon initiation of a service type in the distributed computing system, inserting one or more records in the data structure, each of the one or more records including an identifier of the service type and a node identifier.

4. The method of claim 1, wherein the one or more records each include a slot identifier.

5. The method of claim 4, wherein the slot identifier corresponds to any of task and a time period.

6. The method of claim 1, wherein the number of records inserted into the data structure is defined by a configurable value associated with the first service type.

7. The method of claim 1, wherein the particular unit of work of the first service type is performed to provide a service of the first service type to the distributed computing system, the service of the first service type comprising any of: (i) a cleanup service that deletes data, (ii) a monitoring service to monitor the plurality of nodes, (iii) a data replication service, (iv) a data migration service, (v) a conflict resolution service amongst replicas, (vi) a change propagation service, (vii) a data compaction service, (viii) a view calculation service, and (ix) a view refresh service.

8. A distributed computing system with improved work allocation, comprising:
   a plurality of nodes, each having at least one microprocessor and memory storing computer program instructions for execution on the at least one microprocessor for operation of the respective node, each of the plurality of nodes hosting at least one worker that is of at least one service type and that is for performing units of work of the at least one service type;

the plurality of nodes holding instructions executable to cause the plurality of nodes to:

provide a data structure;

insert one or more records in the data structure, each of the one or more records associated with a unit of work of a first service type and each of the one or more records including an identifier of the first service type and an identifier of a first node in the plurality of nodes;

determine that a second worker of the first service type on a second node of the plurality of nodes should take over a particular unit of work of the first service type from a first worker of the first service type on the first node, wherein the first and second workers each comprise any of a process and a thread running on the first and second nodes, respectively;

modify the record representing the particular unit of work by replacing the identifier of the first node with an identifier of the second node;

wherein said step of determining that the second worker on the second node should take over the particular unit of work from the first worker on the first node comprises:

scoring the load on the first node, based at least in part on the sum of the number of units of work being handled by the first node, where units of work of the first service type are weighted more than units of work of a second service type, the weighting of each of the first and second service types being non-zero;

scoring the load on the second node based at least in part on the sum of the number of units of work being handled by the second node, where units of work of the first service type are weighted more than units of work of the second service type, the weighting of each of the first and second service types being non-zero;

wherein the distributed computing system assigns a weighting to the units of work of the first service type that is more than a weighting for units of work of the second service type at least in part because the second worker, which is the candidate for the take-over, is of the first service type;

comparing the load on the second node to the load on the first node, and determining to take over the particular unit of work based on the results of the comparison.

9. The system of claim 8, wherein the comparison involves determining whether the load on the first node exceeds the load on the second node by a predetermined amount.

10. A method of determining work takeover in a distributed computing system having a plurality of nodes, each node hosting one or more workers, each worker being of a service-type, wherein a given node has a given worker of a first service type that is looking for work, the given worker being any of a process and a thread running on the given node, the method being executed by the distributed computing system, the method comprising:

determining a load score for each of the plurality of nodes, the load score for a node being based on the number of engaged workers running on the node, where an engaged worker of the first service type is weighted more than an engaged worker of a second service type, the weighting of each of the first and second service types being non-zero;

wherein the distributed computing system assign a weighting to the units of work of the first service type that is more than a weighting for units of work of the second service type at least in part because the given worker of the first service type;

identifying the node with the highest load score;

comparing the load score of the given node to the load score of the highest-scoring node;

based on the comparison, determining whether the given node's worker of the first service type should take over for a highest-scoring node's worker of the first service type.

11. The method of claim 10, wherein the comparison includes determining whether the load score of the given node exceeds the load score of the highest-scoring node by a predetermined amount.

12. The method of claim 10, wherein a load score is a point value, and the points awarded for an engaged worker of the first service type is Q points, and an engaged worker of the second service type is awarded R points, wherein Q is at least an order of magnitude larger than R.

13. A distributed computing system with improved work allocation, the system comprising:

a plurality of nodes, each node having at least one microprocessor and memory storing computer program instructions for execution on the at least one microprocessor to operate the respective node;

the plurality of nodes holding instructions executable to cause each of the plurality of nodes to:

host one or more workers, each one of more hosted workers being of at least one service-type and for performing units of work of the at least one service type, wherein a given node has a given worker of a first service type that is looking for work, the given worker being any of a process and a thread running on the given node, the method being executed by the distributed computing system, the method comprising:

determining a load score for each of the plurality of nodes, the load score for a node being based on the number of engaged workers running on the node, where an engaged worker of the first service type is weighted more than an engaged worker of a second service type, the weighting of each of the first and second service types being non-zero;

wherein the distributed computing system assigns a weighting to the units of work of the first service type that is more than a weighting for units of work of the second service type at least in part because the given worker is of the first service type;

identifying the node with the highest load score;

comparing the load score of the given node to the load score of the highest-scoring node;

based on the comparison, determining whether the given node's worker of the first service type should take over for a highest-scoring node's worker of the first service type.

14. The system of claim 13, wherein the comparison includes determining whether the load score of the given node exceeds the load score of the highest-scoring node by a predetermined amount.

15. The system of claim 13, wherein a load score is a point value, and the points awarded for an engaged worker of the first service type is Q points; and an engaged worker of the second service type is awarded R points, wherein Q is at least an order of magnitude larger than R.

* * * * *